United States Patent [19]

Hayes

[11] Patent Number: 4,717,393
[45] Date of Patent: Jan. 5, 1988

[54] POLYIMIDE GAS SEPARATION MEMBRANES

[75] Inventor: Richard A. Hayes, Hockessin, Del.

[73] Assignee: E. I. Du Pont de Nemours and Company, Wilmington, Del.

[21] Appl. No.: 923,485

[22] Filed: Oct. 27, 1986

[51] Int. Cl.$^4$ .............................................. B01D 53/22
[52] U.S. Cl. ........................................... 55/16; 55/68; 55/158; 210/500.39
[58] Field of Search ........................... 55/16, 158, 68; 210/500.39; 528/342, 348

[56] References Cited

U.S. PATENT DOCUMENTS

| | | | |
|---|---|---|---|
| Re. 30,351 | 7/1980 | Hoehn et al. | 55/158 X |
| 3,816,303 | 6/1974 | Wrasidlo | 210/500.39 X |
| 3,822,202 | 7/1974 | Hoehn | 210/500.39 X |
| 3,925,211 | 12/1975 | Schumann et al. | 210/500.39 X |
| 4,113,628 | 9/1978 | Alegranti | 210/500.39 X |
| 4,240,914 | 12/1980 | Iwama et al. | 210/500.39 |
| 4,358,378 | 11/1982 | Iwama et al. | 210/500.39 X |
| 4,370,290 | 1/1983 | Makino et al. | 264/184 |
| 4,378,324 | 3/1983 | Makino et al. | 210/500.39 X |
| 4,378,400 | 3/1983 | Makino et al. | 55/158 X |
| 4,440,643 | 4/1984 | Makino et al. | 210/500.39 X |
| 4,460,526 | 7/1984 | Makino et al. | 264/184 X |
| 4,474,662 | 10/1984 | Makino et al. | 55/158 X |
| 4,474,858 | 10/1984 | Makino et al. | 210/500.39 X |
| 4,485,056 | 11/1984 | Makino et al. | 210/500.39 X |
| 4,486,376 | 12/1984 | Makino et al. | 210/500.39 X |
| 4,528,004 | 7/1985 | Makino et al. | 55/158 |
| 4,532,041 | 7/1985 | Shuey et al. | 210/500.39 |
| 4,578,166 | 3/1986 | Uno et al. | 264/22 X |

FOREIGN PATENT DOCUMENTS

| | | | |
|---|---|---|---|
| 0043265 | 1/1982 | European Pat. Off. | |
| 113574 | 7/1984 | European Pat. Off. | 55/158 |
| 0125908 | 11/1984 | European Pat. Off. | |
| 0132221 | 1/1985 | European Pat. Off. | |
| 143552 | 6/1985 | European Pat. Off. | 210/500.39 |
| 0141781 | 6/1985 | European Pat. Off. | |
| 5344 | 1/1983 | Japan | 55/158 |
| 8512 | 1/1983 | Japan | 55/158 |
| 55313 | 3/1984 | Japan | 55/158 |
| 98704 | 6/1984 | Japan | 55/158 |
| 225705 | 12/1984 | Japan | 55/158 |
| 22902 | 2/1985 | Japan | 55/158 |
| 82103 | 5/1985 | Japan | 55/158 |
| 257805 | 12/1985 | Japan | 55/158 |
| 133106 | 6/1986 | Japan | 210/500.39 |
| 133117 | 6/1986 | Japan | 55/158 |
| 133118 | 6/1986 | Japan | 55/158 |
| 1435151 | 5/1976 | United Kingdom | |
| 2073654 | 10/1981 | United Kingdom | 210/500.39 |
| 2098994 | 12/1982 | United Kingdom | |
| 2101137 | 1/1983 | United Kingdom | |
| 2102333 | 2/1983 | United Kingdom | |
| 2102726 | 2/1983 | United Kingdom | |
| 2104411 | 3/1983 | United Kingdom | |
| 2104832 | 3/1983 | United Kingdom | |
| 2104905 | 3/1983 | United Kingdom | |

*Primary Examiner*—Robert Spitzer

[57] ABSTRACT

Semi-flexible aromatic polyimides, prepared by polycondensation of dianhydrides with phenylene diamines having alkyl substituents on all ortho positions to the amine functions incorporating at least in part 3,3',4,4'-benzophenone tetracarboxylic dianhydride, are auto photochemically crosslinkable. Membranes formed from this class of crosslinked polyimides have improved environmental stability and superior gas selectivity than the corresponding uncrosslinked polyimide. The range of gas permeation properties observed allows for the tailoring of membrane material for widely diverse gas separations. The high permeabilities of some gases from multicomponent mixtures is due to the optimization of the molecular free volume in the polymer.

6 Claims, No Drawings

POLYIMIDE GAS SEPARATION MEMBRANES

BACKGROUND OF THE INVENTION

1. Field of the Invention

The present invention relates to certain substituted crosslinked aromatic polyimide gas separation membranes particularly useful for separating gases and the process of using them.

2. Prior Art

U.S. Pat. No. 3,822,202 and U.S. Pat. No. 3,899,309 disclose aromatic polyimide gas separation membranes in which the molecular structure is such that the molecules in the polymer are unable to pack densely, and, therefore, have high gas permeation rates.

U.S. Pat. No. 4,113,628 and U.K. No. 1,435,151 disclose aromatic polyimide gas separation membranes prepared from polyamide acid membranes.

EPO No. 132,221 and EPO No. 141,781 disclose substituted aromatic polyimides and photochemically crosslinked compositions thereof, but not for use as gas separation membranes.

U.S. Pat. Nos. 4,370,290, 4,460,526, 4,474,662, 4,512,893, U.K. Nos. 2,098,994, 2,101,137, and 2,102,333 disclose microporous aromatic polyimide membranes and the process from which they are prepared.

U.S. Pat. No. 4,486,376 and U.K. No. 2,104,832 disclose gas separation membranes made from a microporous aromatic polyimide support treated with modifying agents.

U.S. Pat. Nos. 4,378,324, 4,440,643, 4,474,858, 4,485,056, 4,528,004, U.K. Nos. 2,102,726, 2,104,411, and 2,104,905 disclose gas separation membranes made from a microporous aromatic polyimide support coated with an aromatic polyamide acid or aromatic polyimide.

U.S. Pat. No. 4,378,400 and EPO No. 43,265 disclose aromatic polyimide gas separation membranes in which the molecular structure is such that the molecules in the polymer can pack densely.

U.S. Pat. No. 4,578,166 discloses polymers comprising as the essential component a saturated linear polyester or polyamide and copolymerized therewith benzophenone tetracarboxylic groups which are crosslinked by irradiation.

EPO No. 113,574 discloses gas separation membranes made from aromatic polyetherimides.

EPO No. 143,552 discloses gas separation membranes made from a microporous aromatic polyimide support coated with a crosslinked silicone resin film.

EPO No. 125,908 discloses aromatic polyimide reverse osmosis membranes.

SUMMARY OF THE INVENTION

The present invention relates to photochemically crosslinked aromatic polyimide gas separation membranes in which the monomeric diamines were at least in part selected from those substituted on essentially all of the positions ortho to the amino substitutents and the monomeric acid anhydride groups were at least in part 3,3',4,4'-benzophenone tetracarboxylic dianhydride. The carbonyl bridge of the dianhydride serves as a crosslinking site. The membranes exhibit very high permeation to gases while still being able to effectively separate several combinations of gases.

DETAILED DESCRIPTION

The present invention relates to the discovery that aromatic polyimides prepared by polycondensation of dianhydrides, at least in part 3,3',4,4'-benzophonetetracarboxylic dianhydrides, with aromatic diamines at least in part having normal or iso alkyl-substituents (joined to those ortho positions by a carbon having at least one -hydrogen atom) on all positions ortho to the amine functions and which are photochemically crosslinked form membranes with exceptional gas permeability and gas selectivity. The gas productivity through these crosslinked polyimide membranes can be controlled by the amount of polyimide chain rigidity and crosslink density incorporated therein. The high gas productivity through these membranes is believed to be due to optimization of the molecular free volume in the polymer structure resulting from a combination of the polymer chain rigidity and crosslink density.

Generally, extremely high gas permeation through dense polymeric membranes is found only with low glass transition temperature (Tg) materials, such as silicone rubbers and a few polyolefin polymers. The low Tg materials are generally only useful as the dense separating layer in composite membranes, where a supporting porous membrane substructure provides structural integrity.

High Tg polymeric materials, found in the prior art, which may possess high gas selectivities, do not possess extremely high gas permeabilities. Examples reported involve mostly unsubstituted, or partially substituted, polymers subject to forming a close chain packing during fabrication and/or subsequent operation.

The present invention circumvents the above shortcomings and provides exceptionally high gas productivity dense membranes using crosslinked aromatic polyimides containing the repeating unit:

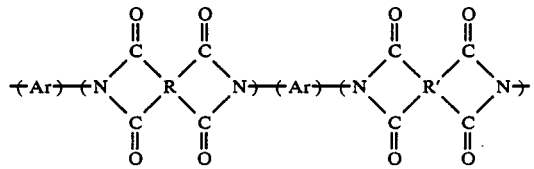

Where —Ar— is

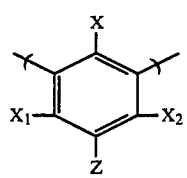 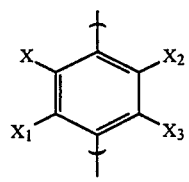

or mixtures thereof,  is

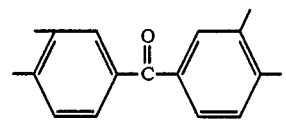

and R′ is 

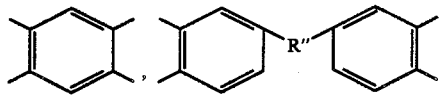

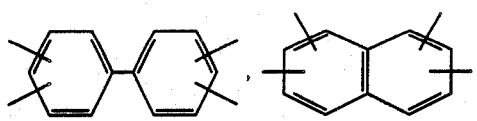

or mixtures thereof

—X, —X$_1$, —X$_2$, and —X$_3$ are independently primary or secondary alkyl groups having 1 to 6 carbon atoms preferably methyl or ethyl, —Z is —H, —X, —X$_1$, —X$_2$, or —X$_3$ and —R″ is

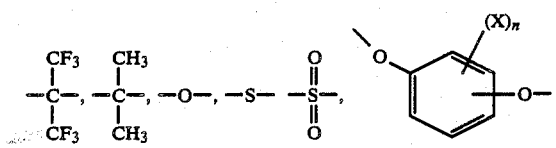

(where n=0 to 4) or alkylene radicals of 1 to 3 carbon atoms and from 5 to 100% R. The multiple substitutions ortho to the amines in the above illustrated structures sterically restricts free rotation around the imide linkage. These amines in combination with structurally rigid dianhydrides form rigid polyimides. The incorporation of more flexible units such as

for dianhydrides, allows for the partial relaxation of this rigidity which may lead to lowered molecular free volume in the polymer. This relaxation promotes greater selectivity for the permeation of certain gases from multicomponent gas mixtures through the membrane. By varying the amount of relaxation in the polymers of this invention, membranes can be tailored for a wide range of gas separations with exceptional gas productivity.

The semi-flexible polyimides described herein are additionally autophotochemically crosslinkable. This further restricts the molecular free volume in the polymer allowing for greater selectivity in the permeation of certain gases from multicomponent gas mixtures through the membrane. Optimization of the amount of relaxation in the polymers and the crosslink density in the membrane should promote the tailoring of membranes for even a wider range of gas separations with improved permeation properties and environmental stability.

The photochemical crosslinking reaction occurs without the addition of added components, such as sensitizers, chain carriers and the like. This avoids possible complications in the membrane formation step, the photochemical crosslinking step, or the use of the resulting membranes in gas separations. For example, if such added components were lost after the photochemical crosslinking step through membrane extraction or other procedures, the resulting membrane may have greatly different gas-separation properties. The mechanism of the photochemical crosslinking reaction is believed to include the absorption of the photochemical energy by the benzophenone chromophore, abstraction of the hydrogen atom from the benzylic function of the alkyl substituent on the diamine by an excited high energy state of the benzophenone function, followed by recombination of the resulting free radicals to form the crosslink. Photochemical mechanisms of this type are described in current photochemistry textbooks and are generally accepted by those practicing the art. The use of the herein described photochemical crosslinking reaction for gas separations membranes is not predicated upon the actual details of the mechanism and the above suggested mechanistic details should not limit the use of this invention.

As preferred examples, some of the fully cyclized polyimides of this invention are soluble in ordinary organic solvents. This is a great advantage for the ease of fabrication of industrially useful membranes. Further, the polyimides reported in this invention range from extremely soluble to insoluble. The soluble polyimides could be solution cast on porous solvent resistant substrates to serve as the dense separating layer of a composite membrane; or they can be solution cast as dense or asymmetric films. Following casting, the membranes can be photochemically crosslinked to enhance solvent resistance and permeation properties. Insoluble examples can be cast into membranes from their polyamic acid form and subsequently chemically or thermally cyclized.

The photochemically crosslinked polyimides described in this invention generally have greatly reduced solvent sensitivity when compared with the respective uncrosslinked polyimide. This affords greater environmental stability in the final membrane.

The polyimides described in this invention have high inherent thermal stabilities. They are stable to 400° C. in air or inert atmospheres. The glass transition temperatures of these polyimides are generally above 300° C. The high temperature characteristics of these polyimides can help to prevent the membrane compaction problems observed in other polymers at even moderate temperatures. These exceptional thermal stabilities are not degraded in the photochemically crosslinked form.

The present invention finds use in recovery of hydrogen in refinery and ammonia plants; separation of carbon monoxide from hydrogen in syngas systems; separation of carbon dioxide or hydrogen sulfide from hydrocarbons; enrichment of oxygen and nitrogen from air for increased combustion or inerting streams, respectively.

EXAMPLES

EXAMPLE 1

To a 50° C. stirred solution of 2,4,6-trimethyl-1,3-phenylene diamine (30.01 g, 0.20 mol) in N-methyl pyrrolidone (600 ml) under an inert atmosphere was added 3,3′,4,4′-benzophenone tetracarboxylic dianhydride (3.22 g, 0.01 mol). After stirring 0.5 hours, 5,5′-2,2,2-trifluoro-1-(trifluoromethyl)ethylidenebis-1,3-isobenzofuranedione

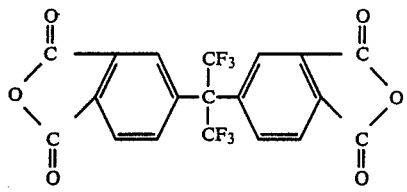

(84.36 g, 0.19 mol, added in eight portions, last portion washed in with 200 ml N-methyl pyrrolidone) was added at 50° C. The yellow solution was stirred at 50° C. overnight, then a solution of acetic anhydride (75.8 mol, 0.80 mol) and triethylamine (112.9 ml, 0.81 mol) was rapidly added and the resulting reaction solution stirred for 2 hours. The reaction solution was precipitated in methanol. The resulting white solid was collected by filtration, washed with methanol and dried in a vacuum oven at room temperature overnight, at 100° C. for 5 hours, and 250° C. for 2 hours to give 104.37 g white product.

Films were cast from a 15% solution of the above polymer (based on weight) in N-methyl pyrrolidone onto a glass plate treated with Du Pont TEFLON® dry lubricant at 80° C. with a 15 mil ($38 \times 10^{-5}$ m) knife gap. The films were dried on a plate at 80° C. for 25 minutes, cooled to room temperature, stripped off the plate and dried in a vacuum oven at room temperature overnight and at 120° C. for 4 hours.

Du Pont TEFLON® dry lubricant contains a fluorocarbon telomer which reduces the adhesion of the membrane to the glass plate.

The above films were consecutively tested for pure gas helium, nitrogen, and carbon dioxide permeabilities at 400 psig ($276 \times 10^5$ Pa), 25° C. Results are reported below:

He Productivity: 29,300 centiBarrer
$N_2$ Productivity: 2,270 centiBarrer
$CO_2$ Productivity: 84,600 centiBarrer
He/$N_2$ Selectivity: 13
$CO_2$/$N_2$ Selectivity: 37.3

A centiBarrer is the number of cubic centimeters of gas passed by the membrane at standard temperature and pressure times the thickness of the membrane in centimeters times $10^{-12}$ divided by the permeating area of the membrane in square centimeters times the time in seconds times the partial pressure difference across the membrane in cm Hg, i.e., $$\text{centiBarrer} = 10^{-12} \frac{cm^3 \text{ (STP)} - cm}{cm^2 - sec - cmHg}$$

The above films were tested for mixed gas $H_2$/$CH_4$ (50/50) (mole) permeabilities at 400 psig ($276 \times 10^5$ Pa), 25° C. Results are reported below:

$H_2$ Productivity: 32,230 centiBarrer
$H_2$/$CH_4$ Selectivity: 9.5

The above films were irradiated with light from a 450 watt Hanovia medium pressure mercury arc lamp for 15 minutes on each side of the film at less than 50° C. A portion of the film was placed into N-methyl pyrrolidone, a good solvent for the uncrosslinked polymer. Some of the film dissolved leaving long strands of crosslinked polymer out of solution.

The above irradiated films were consecutively tested for pure gas helium, nitrogen, and carbon dioxide permeabilities at 400 psig ($276 \times 10^5$ Pa), 25° C. Results are reported below:

He Productivity: 31,200 centiBarrer
$N_2$ Productivity: 480 centiBarrer
$CO_2$ Productivity: 58,400 centiBarrer
He/$N_2$ Selectivity: 65
$CO_2$/$N_2$ Selectivity: 122
and
He Productivity: 31,000 centiBarrer
$N_2$ Productivity: 750 centiBarrer
$CO_2$ Productivity: 62,000 centiBarrer
He/$N_2$ Selectivity: 41
$CO_2$/$N_2$ Selectivity: 82

The irradiated films prepared above were tested for mixed gas $H_2$/$CH_4$ (50/50) permeabilities at 400 psig ($276 \times 105$ Pa), 25° C. Results are shown below:

$H_2$ Productivity: 18,560 centiBarrer
$H_2$/$CH_4$ Selectivity: 38.2

EXAMPLE 2

To a stirred solution of 2,4,6-trimethyl-1,3-phenylene diamine (30.01 g, 0.20 mol) in N-methyl pyrrolidone (600 ml) under an inert atmosphere was added 3,3',4,4'-benzophenone tetracarboxylic dianhydride (6.44 g, 0.02 mol, washed in with 50 ml N-methyl pyrrolidone). After the solution stirred for 0.75 hours, 5,5'-2,2,2-trifluoro-1-(trifluoromethyl)ethylidenebis-1,3-isobenzofuronedione (79.92 g, 0.18 mol, added in seven portions, last portion washed in with 150 ml N-methyl pyrrolidone) was added and the yellow reaction solution stirred for 2 hours. A solution of acetic anhydride (75.8 ml, 0.80 mol) and triethylamine (112.9 ml, 0.81 mol) was rapidly added to the reaction solution and the resulting yellow solution stirred for 2 hours. The reaction solution was precipitated in methanol. The resulting white solid was collected by filtration, washed with methanol and dried in a vacuum oven at room temperature overnight, at 100° C. for 3 hours, and at 250° C. for 3 hours to give 119.5 g product.

Films were cast from a 15% solution of the above polymer (based on weight) in N-methyl pyrrolidone onto a glass plate treated with Du Pont TEFLON® dry lubricant at 75° C. with a 15-mil ($38 \times 10^5$ m) knife gap. The films were dried on the plate at 75° C. for 25 minutes, cooled to room temperature, stripped off the plate, and dried in a vacuum oven at room temperature overnight and at 120° C. for 4 hours.

The above films were consecutively tested for pure gas helium, nitrogen, and carbon dioxide permeabilities at 400 psig ($276 \times 10^5$ Pa), 25° C. Results are reported below:

He Productivity: 28,530 centiBarrer
$N_2$ Productivity: 1,800 centiBarrer
$CO_2$ Productivity: 129,000 centiBarrer
He/$N_2$ Selectivity: 16
$CO_2$/$N_2$ Selectivity: 72

The above films were irradiated with light from a 450 watt Hanovia medium pressure mercury arc lamp for 15 minutes on each side of the film at less than 50° C. A portion of the film was placed in N-methyl pyrrolidone, a good solvent for the uncrosslinked polymer. Some of the film went into solution leaving short strands of crosslinked polymer out of solution.

The above irradiated films were consecutively tested for pure gas helium, nitrogen, and carbon dioxide permeabilities at 400 psig ($276 \times 10^5$ Pa), 25° C. The results are reported below:

He Productivity: 22,800 centiBarrer
$N_2$ Productivity: 124 centiBarrer
$CO_2$ Productivity: 46,000 centiBarrer
He/$N_2$ Selectivity: 184
$CO_2$/$N_2$ Selectivity: 370

EXAMPLE 3

To a 50° C. stirred solution of 2,4,6-trimethyl-1,3-phenylene diamine (30.01 g, 0.20 mol) in N-methyl pyrrolidone (350 ml) under an inert atmosphere was added 3,3',4,4'-benzophenone tetracarboxylic dianhydride (9.21 g, 0.03 mol). After stirring at 50° C. for 0.3 hours, 5,5'-2,2,2-trifluoro-2-(trifluoromethyl)ethylidenebis-1,3-isobenzofuranedione (761 g, 0.17 mol, added in four portions, last portion washed in with 150 ml N-methyl pyrrolidone) was added and the resulting reaction solution stirred at 50° C. overnight. A solution of acetic anhydride (78.5 ml, 0.80 mol) and triethylamine (112.9 ml, 0.81 mol) was rapidly added and the resulting yellow solution stirred at 50° C. for 2 hours. The reaction solution was precipitated in methanol, the white solid collected by filtration, washed with methanol and dried in a vacuum oven at room temperature overnight, at 100° C. for 3 hours and at 220° C. for 3 hours to give 104.2 g product.

Films were cast from at 15% solution of the above polymer (based on weight) in N-methyl pyrrolidone onto a glass plate treated with Du Pont TEFLON ® dry lubricant at 90° C. with a 15 mil ($38 \times 10^{-5}$ m) knife gap. The films were dried on the plate at 90° C. for 25 minutes, cooled to room temperature, and dried in a vacuum oven at room temperature overnight. The films were stripped off the plate and further dried in a vacuum oven at 120° C. for 4 hours.

The above films were consecutively tested for pure gas helium, nitrogen, and carbon dioxide permeabilities at 400 psig ($276 \times 10^5$ Pa), 25° C. Results are reported below:

He Productivity: 28,660 centiBarrer
$N_2$ Productivity: 1,540 centiBarrer
$CO_2$ Productivity: 121,650 centiBarrer
He/$N_2$ Selectivity: 18.6
$CO_2$/$N_2$ Selectivity: 79

The above films were tested for mixed gas $H_2$/$CH_4$ (50/50) (mole) permeabilities at 400 psig ($276 \times 10^5$ Pa), 25° C. Results are reported below:
$H_2$ Productivity: 21,420 centiBarrer
$H_2$/$CH_4$ Selectivity: 13.7

The above films were irradiated with light from a 450 watt Hanovia medium pressure mercury arc lamp for 15 minutes on each side of the film at less than 50° C. A portion of the film was placed in N-methyl pyrrolidone, a good solvent for the uncrosslinked polymer. The solvent became slightly colored but the majority of the film remained out of solution and unswollen.

The above irradiated films were consecutively tested for pure gas helium, nitrogen, and carbon dioxide permeabilities at 400 psig ($276 \times 10^5$ Pa), 25° C. Results are reported below:

He Productivity: 10,300 centiBarrer
$N_2$ Productivity: 210 centiBarrer
$CO_2$ Productivity: 24,400 centiBarrer
He/$N_2$ Selectivity: 49
$CO_2$/$N_2$ Selectivity: 116

The above irradiated films were tested for mixed gas $H_2$/$CH_4$ (50/50) (mole) permeabilities at 400 psig ($276 \times 10^5$ Pa), 25° C. The results are reported below:
$H_2$ Productivity: 22,800 centiBarrer
$H_2$/$CH_4$ Selectivity: 83

EXAMPLE 4

To a 50° C. stirred solution of 2,4,6-trimethyl-1,3-phenylene diamine (30.01 g, 0.20 mol) in N-methyl pyrrolidone (350 ml) under an inert atmosphere was added 3,3',4,4'-benzophenone tetracarboxylic dianhydride (16.1 g, 0.05 mol) and the resulting yellow solution stirred for 0.5 hours. 5,5'-2,2,2-trifluoro-1-(trifluoromethyl)ethylidene-bis-1,3-isobenzofuranedione (66.6 g, 0.15 mol, in four portions, last portion washed in with 150 ml N-methyl pyrrolidone) was added to give a light yellow solution. After stirring overnight at 50° C., a solution of acetic anhydride (75.8 ml, 0.80 mol) and triethylamine (112.9 ml, 0.81 mol) was rapidly added and the resulting reaction solution stirred at 50° C. for 2 hours. The reaction solution was precipitated in methanol, the resulting solid collected by filtration, washed with methanol and dried in a vacuum oven at room temperature overnight, at 100° C. for 3 hours and at 200° C. for 3 hours. The product was an off-white solid (102.3 g).

Films were cast from a 15% solution of the above polymer (based on weight) in N-methyl pyrrolidone onto a glass plate treated with Du Pont TEFLON ® dry lubricant at 90° C. with a 15-mil ($38 \times 10^{-5}$ m) knife gap. The films were dried on the plate at 90° C. for 25 minutes, cooled to room temperature and dried in a vacuum oven at room temperature overnight. The films were stripped off the plate and further dried in a vacuum oven at 120° C. for 4 hours.

The above films were consecutively tested for pure gas helium, nitrogen, and carbon dioxide permeabilities at 400 psig ($276 \times 10^5$ Pa), 25° C. The results are reported below:

He Productivity: 26,520 centiBarrer
$N_2$ Productivity: 2,640 centiBarrer
$CO_2$ Productivity: 90,320 centiBarrer
He/$N_2$ Selectivity: 10
$CO_2$/$N_2$ Selectivity: 34

The above films were tested for mixed gas $H_2$/$CH_4$ (50/50) (mole) permeabilities at 400 psig ($276 \times 10^5$ Pa), 25° C. Results are reported below:

$H_2$ Productivity: 22,080 centiBarrer
$H_2$/$CH_4$ Selectivity: 14.9

The above films were irradiated with light from a 450 watt Hanovia medium pressure mercury arc lamp for 15 minutes on each side of the film at less than 50° C. A portion of the film was placed into N-methyl pyrrolidone, a good solvent for the uncrosslinked polymer. The majority of the film remained out of solution unswollen with a small amount of swollen polymer present.

The above irradiated films were consecutively tested for pure gas helium, nitrogen, and carbon dioxide permeabilities at 400 psig ($276 \times 10^5$ Pa), 25° C. Results are reported below:

He Productivity: 11,900 centiBarrer
$N_2$ Productivity: 62.4 centiBarrer
$CO_2$ Productivity: 25,700 centiBarrer
He/$N_2$ Selectivity: 191
$CO_2$/$N_2$ Selectivity: 412

The above irradiated films were tested for mixed gas $H_2$/$CH_4$ (50/50) (mole) permeabilities at 400 psig ($276 \times 10^5$ Pa), 25° C. Results are reported below:

$H_2$ Productivity: 14,450 centiBarrer
$H_2$/$CH_4$ Selectivity: 53.1

EXAMPLE 5

To a 50° C. stirred solution of 2,4,6-trimethyl-1,3-phenylene diamine (30.01 g, 0.20 mol) in N-methyl pyrrolidone (350 ml) under an inert atmosphere was added 3,3',4,4'-benzophenone tetracarboxylic dianhydride (32.2 g, 0.10 mol). After stirring for 2 hours at 50° C., 5,5'-2,2,2-trifluoro-1-(trifluoromethyl)ethylidene-bis-1,3-isobenzofuranediione (44.4 g, 0.10 mol, added in four portions, last portion washed in with 150 ml N-methyl pyrrolidone) was added to the slightly yellow reaction solution. The reaction solution was allowed to stir at 50° C. overnight. A solution of acetic anhydride (75.8 ml, 0.80 mol) and triethylamine (112.9 ml, 0.81 mol) was added as rapidly as possible to the rapidly stirred reaction solution at 50° C. After stirring for 2 hours, the reaction solution was precipitated in methanol. The resulting white solid was collected by filtration, washed with methanol, and dried in a vacuum oven at room temperature overnight, at 100° C. for 3 hours and at 220° C. for 3 hours to give 96.9 g product.

Films were cast from a 15% solution of the above polymer (based on weight) in N-methyl pyrrolidone onto a glass plate treated with Du Pont TEFLON ® dry lubricant at 90° C. with a 15-mil ($38 \times 10^{-5}$ m) knife gap. The films were dried on the plate at 90° C. for 25 minutes, cooled to room temperature and dried in a vacuum oven at room temperature overnight. The films were stripped off the plate and further dried in a vacuum oven at 120° C. for 4 hours.

The above films were tested for mixed gas $H_2$/$CH_4$ (50/50) (mole) permeabilities at 400 psig ($276 \times 10^5$ Pa), 25° C. Results are reported below:

$H_2$ Productivity: 10,600 centiBarrer
$H_2$/$CH_4$ Selectivity: 20.0

The above films were irradiated with light from a 450 watt Hanovia medium pressure mercury arc lamp for 15 minutes on each side of the film at less than 50° C. A portion of the film was placed into N-methyl pyrrolidone, a good solvent for the uncrosslinked polymer. The solvent became slightly colored but the film did not dissolve or become swollen.

The above irradiated films were tested for mixed gas $H_2$/$CH_4$ (50/50) (mole) permeabilities at 400 psig ($276 \times 10^5$ Pa), 25° C. Results are reported below:

$H_2$ Productivity: 6,100 centiBarrer
$H_2$/$CH_4$ Selectivity: 222.4

EXAMPLE 6

To a 50° C. stirred solution of 2,3,5,6-tetramethyl-1,4-phenylene diamine (32.86 g, 0.20 mol) in N-methyl pyrrolidone (500 ml) under an inert atmosphere was sequentially added 3,3',4,4'-benzophenone tetracarboxylic dianhydride (3.22 g, 0.01 mol) and 5,5'-2,2,2-trifluoro-1-(trifluoromethyl)ethylidenebis-1,3-isobenzofuranedione (84.36 g, 0.19 mol, added in four portions, last portion washed in with 250 ml N-methyl pyrrolidone) and the resulting yellow solution was stirred overnight at 50° C. A solution of acetic anhydride (75.8 ml, 0.80 mol) and triethylamine (112.9 ml, 0.81 mol) was rapidly added to the reaction solution. After stirring at 50° C. for 2 hours, the yellow reaction solution was precipitated in methanol. The resulting white solid was collected by filtration, washed with methanol, and dried in a vacuum oven at room temperature overnight, at 100° C. for 4 hours and at 250° C. for 3 hours to give 112 g product.

Films were cast from 12.5% solution of the above polymer (based on weight) in N-methyl pyrrolidone onto a glass plate treated with Du Pont TEFLON ® dry lubricant at 85° C. with a 15-mil ($38 \times 10^{-5}$ m) knife gap. The films were dried on the plate at 85° C. for 25 minutes, cooled to room temperature and dried in a vacuum oven at room temperature overnight. The films were stripped off the plate and further dried in a vacuum oven at 120° C. for 4 hours.

The above films were consecutively tested for pure gas helium, nitrogen, and carbon dioxide permeabilities at 400 psig ($276 \times 10^5$ Pa), 25° C. Results are reported below:

He Productivity: 39,600 centiBarrer
$N_2$ Productivity: 3,500 centiBarrer
$CO_2$ Productivity: 230,900 centiBarrer
He/$N_2$ Selectivity: 11.3
$CO_2$/$N_2$ Selectivity: 66

The above films were tested for mixed gas $O_2$/$N_2$ (21/79) (mole) permeabilities at 300 psig ($206 \times 10^5$ Pa), 25° C. Results are reported below:

$O_2$ Productivity: 14,100 centiBarrer
$O_2$/$N_2$ Selectivity: 3.4

The above films were tested for mixed gas $H_2$/$CH_4$ (50/50) (mole) permeabilities at 400 psig ($276 \times 10^5$ Pa), 25° C. Results are reported below:

$H_2$ Productivity: 33,980 centiBarrer
$H_2$/$CH_4$ Selectivity: 6.8

The above films were irradiated with light from a 50 watt Hanovia low pressure mercury arc lamp (film 4 inches from lamp) at 25° C. for 1 hour on one side. A portion of the film was placed into N-methyl pyrrolidone, a good solvent for the uncrosslinked polymer. A thin unswollen film surface remained out of solution along with swollen strands of photocrosslinked polymer.

The above irradiated films were tested for mixed gas $O_2$/$N_2$ (21/79) (mole) permeabilities at 300 psig ($206 \times 10^5$ Pa), 25° C. Results are reported below:

$O_2$ Productivity: 4,600 centiBarrer $O_2/N_2$ Selectivity: 6.8

The above irradiated films were consecutively tested for pure gas helium, nitrogen, methane, carbon dioxide, and nitrogen permeabilities at 300 psig ($206 \times 10^5$ Pa), 25° C. Results are reported below:

He Productivity: 28,159 centiBarrer
$N_2$ Productivity: 610 centiBarrer
$CH_4$ Productivity: 106 centiBarrer
$CO_2$ Productivity: 19,787 centiBarrer
$N_2$ Productivity: 868 centiBarrer
He/$N_2$ Selectivity: 46.2
He/$CH_4$ Selectivity: 266
$CO_2/CH_4$ Selectivity: 187
$CO_2/N_2$ Selectivity: 22.8

The above non-irradiated films were irradiated with light from a 450 watt Hanovia medium pressure mercury arc lamp for 15 minutes on each side of the film at less than 50° C. A portion of the film was placed in N-methyl pyrrolidone, a good solvent for the uncrosslinked polymer. Some of the film went into solution leaving strands of crosslinked polymer out of solution.

The above irradiated films were tested for mixed gas $H_2/CH_4$ (50/50) (mole) permeabilities at 400 psig ($276 \times 10^5$ Pa), 25° C. Results are reported below:

$H_2$ Productivity: 31,000 centiBarrer
$H_2/CH_4$ Selectivity: 183

The above films were consecutively tested for pure gas carbon dioxide, nitrogen, and helium permeabilities at 400 psig ($276 \times 10^5$ Pa), 25° C. The results are reported below:

$CO_2$ Productivity: 16,400 centiBarrer
$N_2$ Productivity: 410 centiBarrer
He Productivity: 55,500 centiBarrer
He/$N_2$ Selectivity: 137
$CO_2/N_2$ Selectivity: 40

The above irradiated films were tested for mixed gas $O_2/N_2$ (21/79) (mole) permeabilities at 300 psig ($706 \times 10^5$ Pa), 25° C. The results are reported below:

$O_2$ Productivity: 2,900 centiBarrer
$O_2/N_2$ Selectivity: 7.4

EXAMPLE 7

To a 50° C. stirred solution of 2,4,6-trimethyl-1,3-phenylene diamine (30.01 g, 0.20 mol) in N-methyl pyrrolidone (500 ml) under an inert atmosphere was sequentially added 3,3',4,4'-benzophenone tetracarboxylic dianhydride (3.22 g, 0.01 mol) and 1,2,4,5-benzenetetracarboxylic dianhydride (41.44 g, 0.19 mol, added in four portions). After stirring overnight at 50° C., a solution of acetic anhydride (75.8 ml, 0.80 mol) and triethylamine (112.9 ml, 0.81 mol) was rapidly added and the resulting orange solution stirred for 2 hours at 50° C. The reaction solution was precipitated in methanol. The resulting orange solid was collected by filtration, washed with methanol, and dried in a vacuum oven at room temperature overnight, at 100° C. for 3 hours and at 250° C. for 3 hours to give 67.1 g product.

Films were cast from at 10% solution of the above polymer (based on weight) in N-methyl pyrrolidone onto a glass plate treated with Du Pont TEFLON® dry lubricant at 80° C. with a 15-mil ($38 \times 10^{-5}$ m) knife gap. The films were dried on the plate at 80° C. for 30 minutes, cooled to room temperature and dried in a vacuum oven at room temperature overnight. The films were stripped off the plate and further dried in a vacuum oven at 120° C. for 4 hours.

The above films were tested for mixed gas $O_2/N_2$ (21/79) (mole) permeabilities at 450 psig ($310 \times 10^5$ Pa), 25° C. Results are reported below:

$O_2$ Productivity: 3,100 centiBarrer
$O_2/N_2$ Selectivity: 4.1

The above films were tested for mixed gas $H_2/CH_4$ (50/50) (mole) permeabilities at 400 psig ($276 \times 10^5$ Pa), 25° C. Results are reported below:

$H_2$ Productivity: 21,960 centiBarrer
$H_2/CH_4$ Selectivity: 9.3

The above films were irradiated with a 50 watt Hanovia low pressure mercury arc lamp (film 4 inches from lamp) for 1 hour at 25° C. on one side. A portion of the film was placed into N-methyl pyrrolidone, a good solvent for the uncrosslinked polymer. The majority of the film dissolved leaving long strands of swollen crosslinked polymer out of solution.

The above irradiated films were tested for mixed gas $O_2/N_2$ (21/79) (mole) permeabilities at 300 psig ($206 \times 10^5$ Pa), 25° C. Results are reported below:

$O_2$ Productivity: 2,400 centiBarrer
$O_2/N_2$ Selectivity: 6.8

The above non-irradiated films were irradiated with light from a 450 watt Hanovia medium pressure mercury arc lamp for 15 minutes on each side of the film at less than 50° C. A portion of the film was placed in N-methyl pyrrolidone, a good solvent for the uncrosslinked polymer. The majority of the film dissolved leaving strands of swollen crosslinked polymer out of solution.

The above irradiated films were tested for mixed gas $H_2/CH_4$ (50/50) (mole) permeabilities at 400 psig ($276 \times 10^5$ Pa), 25° C. Results are reported below:

$H_2$ Productivity: 18,320 centiBarrer
$H_2/CH_4$ Selectivity: 134

EXAMPLE 8

To a 50° C. stirred solution of 2,4,6-trimethyl-1,3-phenylene diamine (30.01 g, 0.20 mol) in N-methyl pyrrolidone (350 ml) under an inert atmosphere was added 3,3',4,4'-benzophenone tetracarboxylic dianhydride (6.44 g, 0.02 mol) and the resulting solution stirred for 0.75 hours. At 50° C. with stirring, 1,2,4,5-benzenetetracarboxylic dianhydride (39.3 g, 0.18 mol, added in four portions, last portion washed in with 150 ml N-methyl pyrrolidone) was added and the orange reaction solution stirred overnight at 50° C. A solution of acetic anhydride (75.8 ml, 0.80 mol) and triethylamine (112.9 ml, 0.81 mol) was added as fast as possible to the rapidly stirring 50° C. reaction solution. A solid precipitated, but slowly went back into solution. After stirring at 50° C. for 2 hours, the orange reaction solution was precipitated in methanol. The resulting yellow solid was collected by filtration, washed with methanol and dried in a vacuum oven at room temperature overnight, at 100°

C. for 3 hours and at 230° C. for 3 hours. This gave 68.5 g product as yellow-orange solid.

Films were cast from a 12.5% solution of the above polymer (based on weight) in N-methyl pyrrolidone onto a glass plate treated with Du Pont TEFLON ® dry lubricant at 90° C. with a 15 mil ($38 \times 10^{-5}$ m) knife gap. The films were dried on the plate at 90° C. for 25 minutes, cooled to room temperature, and dried in a vacuum oven at room temperature overnight. The films were stripped off the plate and further dried in a vacuum oven at 120° C. for 4 hours.

The above films were consecutively tested for pure gas helium, nitrogen, and carbon dioxide permeabilities at 400 psig ($286 \times 10^5$ Pa), 25° C. Results are reported below:

He Productivity: 22,730 centiBarrer
$N_2$ Productivity: 1,400 centiBarrer
$CO_2$ Productivity: 118,600 centiBarrer
$He/N_2$ Selectivity: 16
$CO_2/N_2$ Selectivity: 85

The above films were tested for mixed gas $H_2/CH_4$ (50/50) (mole) permeabilities at 400 psig ($276 \times 10^5$ Pa), 25° C. Results are reported below:

$H_2$ Productivity: 23,600 centiBarrer
$H_2/CH_4$ Selectivity: 9.2
and
$H_2$ Productivity: 29,380 centiBarrer
$H_2/CH_4$ Selectivity: 7.4

The above films were irradiated with light from a 450 watt Hanovia medium pressure mercury arc lamp for 15 minutes on each side of the film at less than 50° C. A portion of the film was placed in N-methyl pyrrolidone, a good solvent for the uncrosslinked polymer. The film partially dissolved leaving long strands of swollen crosslinked polymer out of solution.

The above irradiated films were consecutively tested for pure gas helium, nitrogen, and carbon dioxide permeabilities at 400 psig ($276 \times 10^5$ Pa), 25° C. Results are reported below:

He Productivity: 960 centiBarrer
$N_2$ Productivity: 19.6 centiBarrer
$CO_2$ Productivity: 2,100 centiBarrer
$He/N_2$ Selectivity: 49
$CO_2/N_2$ Selectivity: 107

The above irradiated films were tested for mixed gas $H_2/CH_4$ (50/50) (mole) permeabilities at 400 psig, 25° C. Results are reported below:

$H_2$ Productivity: 12,720 centiBarrer
$H_2/CH_4$ Selectivity: 81.7

EXAMPLE 9

To a 50° C. stirred solution of 2,4,6-trimethyl-1,3-phenylene diamine (30.01 g, 0.20 mol) in N-methyl pyrrolidone (350 ml) under an inert atmosphere was added 3,3',4,4'-benzophenone tetracarboxylic dianhydride (9.21 g, 0.029 mol). After the yellow solution had stirred for 0.50 hours, 1,2,4,5-benzenetetracarboxylic dianhydride (37.4 g, 0.17 mol, added in four portions, last portion washed in with 150 ml N-methyl pyrrolidone) was added and the resulting orange reaction solution stirred overnight at 50° C. A solution of acetic anhydride (75.8 ml, 0.80 mol) and triethylamine (112.9 ml, 0.81 mol) was added as fast as possible to the rapidly stirred 50° C. reaction solution. A solid precipitated, but went back into solution after 3 minutes. The resulting orange reaction solution was stirred at 50° C. for 2 hours and then precipitated in methanol. The off-white solid was collected by filtration, washed with methanol and dried in a vacuum oven at room temperature overnight, at 100° C. for 3 hours and at 220° C. for 3 hours to give 69.4 g of an orange product.

Films were cast from a 15% solution of the above polymer (based on weight) in N-methyl pyrrolidone onto a glass plate treated with Du Pont TEFLON ® dry lubricant at 90° C. with a 15 mil ($38 \times 10^{-5}$ m) knife gap. The films were dried on the plate at 90° C. for 25 minutes, cooled to room temperature, and dried in a vacuum oven at room temperature overnight.

The films were stripped off the plate and further dried in a vacuum oven at 120° C. for 4 hours.

The above films were tested for mixed gas $H_2/CH_4$ (50/50) (mole) permeabilities at 400 psig ($276 \times 10^5$ Pa), 25° C. Results are shown below:

$H_2$ Productivity: 24,050 centiBarrer
$H_2/CH_4$ Selectivity: 8.3

The above films were irradiated with light from a 450 watt Hanovia medium pressure mercury arc lamp for 15 minutes on each side of the film at less than 50° C. A portion of the film was placed in N-methyl pyrrolidone, a good solvent for the uncrosslinked polymer. A small amount of the film went into solution, but the majority remained out of solution either as swollen strands or unswollen layers of film.

The above irradiated films were tested for mixed gas $H_2/CH_4$ (50/50) (mole) permeabilities at 400 psig ($276 \times 10^5$ Pa), 25° C. The results are reported below:

$H_2$ Productivity: 12,430 centiBarrer
$H_2/CH_4$ Selectivity: 373

EXAMPLE 10

To a stirred solution of 2,4,6-trimethyl-1,3-phenylene diamine (30.05 g, 0.20 mol) in N-methyl pyrrolidone (450 ml) at room temperature under a nitrogen atmosphere was added 3,3',4,4'-benzophenone tetracarboxylic dianhydride (16.11 g, 0.05 mol, washed in with N-methyl pyrrolidone (50 ml)). After stirring at room temperature for 0.5 hours, 1,2,4,5-benzenetetracarboxylic dianhydride (32.72 g, 0.15 mol, washed in with N-methyl pyrrolidone (100 ml)) was added and the yellow solution allowed to stir for 2 hours. A solution of acetic anhydride (75.84 ml, 0.80 mol) and triethylamine (112.94 ml, 0.80 mol) was added as fast as possible with fast stirring. A white solid precipitated, but went back in to form a viscous golden yellow solution. After stirring 2 hours the reaction solution was precipitated in methanol, the resulting off-white solid collected by filtration, and dried in vacuo overnight at room temperature, 4 hours at 100° C. and 3 hours at 240° C. to give product (69.3 g).

Films were cast from a 15% solution of the above polymer (based on weight) in N-methyl pyrrolidone onto a glass plate treated with Du Pont TEFLON ® dry lubricant at 80° C. with a 15-mil ($38 \times 10^{-5}$ m) knife gap. The films were dried on the plate at 80° C. for 25 minutes, cooled to room temperature and dried in a vacuum oven at room temperature overnight. The films were stripped off the plate and further dried in a vacuum oven at 120° C. for 4 hours.

The above films were tested for mixed gas $H_2/CH_4$ (50/50) (mole) permeabilities at 400 psig ($276 \times 10^5$ Pa), 25° C. Results are reported below:

$H_2$ Productivity: 10,170 centiBarrer
$H_2/CH_4$ Selectivity: 20.4

The above films were tested for mixed gas $CO_2/CH_4$ (50/50) (mole) permeabilities at 245 psig ($169 \times 10^5$ Pa), 25° C. Results are reported below:

$CO_2$ Productivity: 9,517 centiBarrer
$CO_2/CH_4$ Selectivity: 30

The above films were irradiated with a 50 watt Hanovia low pressure mercury arc lamp for 1.5 hours on one side at 25° C. A portion of the film was placed in N-methyl pyrrolidone, a good solvent for the uncrosslinked polymer. The majority of the film went into solution quickly, but a thin unswollen film remained out of solution.

The above irradiated films were tested for mixed gas $CO_2/CH_4$ (50/50) (mole) permeabilities at 245 psig ($169 \times 10^5$ Pa), 25° C. Results are reported below:

$CO_2$ Productivity: 474 centiBarrer
$CO_2/CH_4$ Selectivity: 86

The above non-irradiated films were irradiated with light from a 450 watt Hanovia medium pressure mercury arc lamp for 15 minutes on each side of the film at less than 50° C. A portion of the film was placed in N-methyl pyrrolidone, a good solvent for the uncrosslinked polymer. A small amount of the film went into solution, but the majority remained out of solution either as swollen strands or unswollen layers of film.

The above irradiated films were tested for mixed gas $H_2/CH_4$ (50/50) (mole) permeabilities at 400 psig ($276 \times 10^5$ Pa), 25° C. Results are reported below:

$H_2$ Productivity: 5,110 centiBarrer
$H_2/CH_4$ Selectivity: 612

EXAMPLE 11

To a stirred solution of 2,4,6-trimethyl-1,3-phenylene diamine (30.05 g, 0.20 mol) in N-methyl pyrrolidone (500 ml) was added 3,3',4,4'-benzophenone tetracarboxylic dianhydride (32.22 g, 0.10 mol, washed in with 100 ml N-methyl pyrrolidone) at room temperature under an inert atmosphere. The slightly yellow solution was stirred for 0.5 hours and then 1,2,4,5-benzenetetracarboxylic dianhydride (21.8 g, 0.10 mol, washed in with N-methyl pyrrolidone (100 ml)). The yellow solution turned more viscous and was stirred for 2 hours at room temperature. A solution of acetic anhydride (75.84 ml, 0.80 mol) and triethylamine (112.94 ml, 0.80 mol) was rapidly added with fast stirring, causing a small amount of white solid to precipitate. As the solid redissolved, the solution became a viscous orange-yellow solution. After stirring for 2 hours, the reaction solution was precipitated from methanol, the white solid collected by filtration, and the reaction product washed with methanol. The solid was dried in a vacuo overnight at room temperature, 3 hours at 100° C. and 3 hours at 220° C. to give 73.6 g product.

Films were cast from a 15% solution of the above polymer (based on weight) in N-methyl pyrrolidone onto a glass plate treated with Du Pont TEFLON® dry lubricant at 75° C. with a 15-mil ($38 \times 10^{-5}$ m) knife gap. The films were dried on the plate at 75° C. for 25 minutes, then at room temperature for 30 minutes. The films were stripped off the plate and dried at room temperature in a vacuum oven for 4 hours and at 120° C. in a vacuum oven for 4 hours.

The above films were tested for mixed gas $H_2/CH_4$ (50/50) (mole) permeabilities at 400 psig ($276 \times 10^5$ Pa), 25° C. Results are reported below:

$H_2$ Productivity: 6,590 centiBarrer
$H_2/CH_4$ Selectivity: 31.4

The above films were irradiated with light from a 450 watt Hanovia medium pressure mercury arc lamp for 15 minutes on each side of the film at less than 50° C. A portion of the film was placed in N-methyl pyrrolidone, a good solvent for the uncrosslinked polymer. Some of the film went into solution, but the majority remained out of solution either as swollen strands or unswollen layers of film.

The above irradiated films were tested for mixed gas $H_2/CH_4$ (50/50) (mole) permeabilities at 400 psig ($276 \times 10^5$ Pa), 25° C. The results are reported below:

$H_2$ Productivity: 5,050 centiBarrer
$H_2/CH4$ Selectivity: 471

EXAMPLE 12

To a stirred, 50° C. solution of 2,4,6-trimethyl-1,3-phenylene diamine (30.1 g, 0.20 mol) in N-methyl pyrrolidone (350 ml) under an inert atmosphere was added 3,3',4,4'-benzophenone tetracarboxylic dianhydride (48.3 g, 0.15 mol). After stirring for 0.5 hours, 1,2,4,5-benzene-tetracarboxylic dianhydride (10.9 g, 0.05 mol, washed in with 150 ml N-methyl pyrrolidone) was added and the resulting orange solution allowed to stir at 50° C. overnight. A solution of acetic anhydride (75.8 ml, 0.80 mol) and triethylamine (112.9 ml, 0.81 mol) was added as rapidly as possible to the rapidly stirring reaction solution and the resulting orange solution stirred at 50° C. for 2 hours. The reaction solution was precipitated in methanol, the off-white solid collected by filtration, washed with methanol and dried in a vacuum oven at room temperature overnight, at 100° C. for 3 hours and at 220° C. for 3 hours. The off-white product was collected in a 89.8 g yield.

Films were cast from a 12.5% solution (based on weight) of the above polymer in N-methyl pyrrolidone onto a glass plate treated with Du Pont TEFLON® dry lubricant at 90° C. with a 15-mil ($38 \times 10^{-5}$ m) knife gap.

The films were dried on the plate at 90° C. for 25 minutes, cooled to room temperature and dried in a vacuum oven at room temperature overnight. The films were stripped off the plate and further dried in a vacuum oven at 120° C. for 4 hours.

The above films were tested for mixed gas $H_2/CH_4$ (50/50) (mole) permeabilities at 400 psig ($276 \times 10^5$ Pa), 25° C. Results are reported below:

$H_2$ Productivity: 6,850 centiBarrer
$H_2/CH_4$ Selectivity: 28.3

The above films were irradiated with light from a 450 watt Hanovia medium pressure mercury arc lamp for 15 minutes on each side of the film at less than 50° C. A portion of the film was placed in N-methyl-pyrrolidone, a good solvent for the uncrosslinked polymer. The film remained out of solution but was slightly swollen.

The above irradiated films were tested for mixed gas $H_2/CH_4$ (50/50) (mole) permeabilities at 400 psig ($276 \times 10^5$ Pa), 25° C. The results are reported below:

$H_2$ Productivity: 3,100 centiBarrer
$H_2/CH_4$ Selectivity: 720

EXAMPLE 13

To a stirred solution of 2,4,6-trimethyl-1,3-phenylene diamine (30.5 g, 0.2 mol) in N-methyl pyrrolidone (450 ml) was added 3,3',4,4'-benzophenone tetracarboxylic dianhydride (9.21 g, 0.029 mol) at 50° C. under an inert atmosphere. After stirring for 30 minutes, 5,5'-2,2,2-trifluoro-1-(trifluoromethyl)ethylidenebis-1,3-isobenzofuranedione (19.03 g, 0.043 mol, in three portions) was added. The yellow solution was stirred at 50° C. for 15 minutes when 1,2,4,5-benzenetetracarboxylic dianhydride (28.04 g, 0.129 mol, in three portions, last portion washed in with N-methyl pyrrolidone (300 ml)) was added. The resulting orange-yellow reaction solution was stirred at 50° C. under an inert atmosphere overnight. A solution of acetic anhydride (75.8 ml, 0.80 mol) and triethylamine (112.9 ml, 0.80 mol) was added as quickly as possible to the rapidly stirred reaction solution at 50° C. The resulting orange reaction solution was stirred for 2 hours at 50° C. The reaction solution was precipitated in methanol, the resulting white solid collected by filtration, and washed with additional methanol. The white solid was dried in a vacuum oven at ambient temperature overnight, at 120° C. for 4 hours and at 260° C. for 4 hours to give 77 g product.

Films were cast from a 15% solution (based on weight) of the above polymer in N-methyl pyrrolidone onto a glass plate treated with Du Pont TEFLON® dry lubricant at 90° C. with a 15-mil ($38 \times 10^{-5}$ m) knife gap. The films were dried on the plate at 90° C. for 25 minutes, cooled to room temperature and dried in a vacuum oven at room temperature overnight. The films were stripped off the plate and further dried in a vacuum oven at 120° C. for 4 hours.

The films were consecutively tested for pure gas helium, nitrogen, and carbon dioxide permeabilities at 400 psig ($276 \times 10^5$ Pa), 25° C. Results are reported below:

He Productivity: 22,600 centiBarrer
$N_2$ Productivity: 600 centiBarrer
$CO_2$ Productivty: 91,000 centiBarrer
He/$N_2$ Selectivty: 38
$CO_2/N_2$ Selectivity: 152

The above films were tested for mixed gas $H_2/CH_4$ (50/50) (mole) permeabilities at 400 psig, ($276 \times 10^5$ Pa), 25° C. Results are reported below:

$H_2$ Productivity: 25,000 centiBarrer
$H_2/CH_4$ Selectivity: 6.1

The above films were irradiated with light from a 450 watt Hanovia medium pressure mercury arc lamp for 15 minutes on each side of the film at less than 50° C. A portion of the film was placed in N-methyl-pyrrolidone, a good solvent for the uncrosslinked polymer. A small portion of the film dissolved leaving long strands of swollen crosslinked polymer.

The above irradiated films were consecutively tested for pure gas helium, nitrogen, and carbon dioxide permeabilities at 400 psig ($276 \times 10^5$ Pa), 25° C. Results are reported below:
He Productivity: 12,150 centiBarrer
$N_2$ Productivity: 40 centiBarrer
$CO_2$ Productivity: 12,100 centiBarrer
He/$N_2$ Selectivity: 304
$CO_2/N_2$ Selectivity: 303

The above irradiated films were tested for mixed gas $H_2/CH_4$ (50/50) (mole) permeabilities at 400 psig ($276 \times 10^5$ Pa), 25° C. The results are reported below:

$H_2$ Productivity: 18,100 centiBarrer
$H_2/CH_4$ Selectivity: 281

EXAMPLE 14

N-methyl pyrrolidone (750 ml) was added to a mixture of 3,3',4,4'-benzophenone tetracarboxylic dianhydride (64.44 g, 0.20 mol) and 2,4,6-trimethyl-1,3-phenylene diamine (30.5 g, 0.20 mol) at 50° C. in an inert atmosphere with stirring. The resulting golden viscous solution was stirred at 50° C. for 3 hours. A solution of acetic anhydride (75.84 g ml, 0.80 mol) and triethylamine (112.94 ml, 0.81 mol) was added with stirring at 50° C. causing the color to change from golden to a dark orange. After stirring for 1.5 hours at 50° C., the viscous solution was precipitated in methanol and the resulting white solid collected by filtration. The polymer was dried in a vacuum oven at room temperature overnight, at 100° C. for 3 hours and at 200° C. for 4 hours to give the product (85.2 g) as a light yellow solid.

Films were cast from a 10% solution (based on weight) of the above polymer in N-methyl pyrrolidone onto a glass plate treated with Du Pont TEFLON® dry lubricant at 80° C. with a 15-mil ($38 \times 10^{-5}$ m) knife gap. The films were dried on the plate at room temperature, stripped off the plate and dried at room temperature overnight in a vacuum oven, and at 220° C. for 6 hours in a vacuum oven.

Differential Scanning Calorimetry (DSC) was performed on the above film using a Du Pont Thermal Analyzer Model 990-3 with cell model HCB1-S/N00523, Baseline scope=5.0 in a nitrogen atmosphere at a 10° C./minute progress rate. No transitions correlatable to a Tg or Tm were observed up to 400° C.

Thermogravimetric Analysis (TGA) was performed on the above film using a Du Pont Thermogravimetric Analyzer Model 99-2 with cell Model 951-5 in a nitrogen atmosphere at a 10° C./minute progress rate. A 10% weight loss was observed at 565° C. and a 40% weight loss was observed at 695° C.

The above films were tested for mixed gas $CO_2/CH_4$ (50/50) (mole) permeabilities at 250 psig, ($172 \times 10^5$ Pa), 25° C. Results are reported below:

$CO_2$ Productivity: 3,746 centiBarrer
$CH_4$ Productivity: 115 centiBarrer
$CO_2/CH_4$ Selectivity: 32.4
or
$CO_2$ Productivity: 3,796 centiBarrer
$CH_4$ Productivity: 122 centiBarrer
$CO_2/CH_4$ Selectivity: 31

The above films were irradiated with light from a 50 watt Hanovia low pressure mercury arc lamp (film 4 in. from lamp)for 1.5 hours on one side of the film at 25° C. A portion of the film was placed in N-methyl-pyrrolidone, a good solvent for the uncrosslinked polymer. The film did not dissolve or swell after prolonged contact.

Differential Scanning Calorimetry (DSC) was performed on the above irradiated film using a Du Pont Thermal Analyzer Model 990-3 with cell model HCB1-S/N00523, Baseline scope=5.0 in a nitrogen atmosphere at a 10° C./minute progress rate. No transitions correlatable to a Tg or Tm were observed up to 400 ° C.

Thermogravimetric Analysis (TGA) was performed on the above irradiated film using a Du Pont Thermogravimetric Analyzer Model 99-2 with cell Model 951-5 in a nitrogen atmosphere at a 10° C./minute progress rate. A 10% weight loss was observed at 565° C. and a 40% weight loss was observed at 695° C.

The above irradiated films were tested for mixed gas $CO_2/CH_4$ (50/50) (mole) permeabilities at 250 psig ($172 \times 10^5$ Pa), 25° C. The results are reported below:

$CO_2$ Productivity: 95.4 centiBarrer
$H_2/CH_4$ Selectivity: 93.3

EXAMPLE 15

To a stirred solution of 2,3,5,6-tetramethyl-1,4-phenylene diamine (24.64 g, 0.15 mol) in N-methyl pyrrolidone (400 ml) under an inert atmosphere at room temperature was portionwise added 3,3',4,4'-benzophenone tetracarboxylic dianhydride (48.33 g, 0.15 mol, added in four portions, last portion washed with N-methyl pyrrolidone (120 ml)). After stirring 3 hours at room temperature, a solution of acetic anhydride (56.88 ml, 0.60 mol), and triethylamine (84.21 ml, 0.60 mol) was rapidly added causing a white solid to precipitate out of the lemony yellow solution. The solid went back into solution to form dark orange viscous solution which was stirred at room temperature for 2 hours. The reaction resulting solid collected by filtration, washed with methanol and dried in a vacuum oven at room temperature overnight, at 100° C. for 3 hours and at 220° C. for 3 hours to give a 66.6 g product.

Films were cast from a 15% solution (based on weight) of the above polymer in N-methyl pyrrolidone onto a glass plate treated with Du Pont TEFLON ® dry lubricant at 80° C. with a 15-mil ($38 \times 10^{-5}$) knife gap. The films were dried on the plate at 80° C. for 25 minutes, cooled to room temperature and dried in a vacuum oven at room temperature overnight.

The films were stripped off the plate and further dried in a vacuum oven at 100° C. for 4 hours.

The above films were tested for mixed gas $CO_2/CH_4$ (50/50) (mole) permeabilities at 245 psig ($171 \times 10^5$ Pa), 25° C. Results are reported below:

$CO_2$ Productivity: 2,671 centiBarrer
$CO_2/CH_4$ Selectivity: 8.5

The above films were tested for mixed gas $H_2/CH_4$ (50/50) (mole) permeabilities at 400 psig ($276 \times 10^5$ Pa), 25° C. The results are reported below:

$H_2$ Productivity: 3,350 centiBarrer
$H_2/CH_4$ Selectivity: 25.2

The above films were irradiated with light from a 50 watt Hanovia low pressure mercury arc lamp (film 4 in. from lamp) for 1 hour on one side at 25° C.

The film turned color from clear yellow to clear orange. A portion of the film was placed in N-methyl pyrrolidone, a good solvent for the uncrosslinked polymer. The majority of the film became swollen but did not go into solution.

The above irradiated films were tested for mixed gas $CO_2/CH_4$ (50/50) (mole) permeabilities at 245 psig ($171 \times 10^5$ Pa), 25° C. Results are reported below:

$CO_2$ Productivity: 243 centiBarrer
$CO_2/CH_4$ Selectivity: 124

The above non-irradiated films were irradiated with light from a 450 watt Hanovia medium pressure mercury arc lamp for 15 minutes on each side at less than 50° C. A portion of the film was placed in N-methyl pyrrolidone, a good solvent for the uncrosslinked polymer. The film remained out of solution but was slightly swollen.

The above irradiated films were tested for mixed gas $H_2/CH_4$ (50/50) (mole) permeabilities at 400 psig ($276 \times 10^5$ Pa), 25° C. Results are reported below:

$H_2$ Productivity: 2,760 centiBarrer
$H_2/CH_4$ Selectivity: 312

I claim:

1. A process for separating gases comprising bringing a mixture of two or more gases under pressure into contact with a membrane formed of a photochemically crosslinked aromatic polyimide of the formula

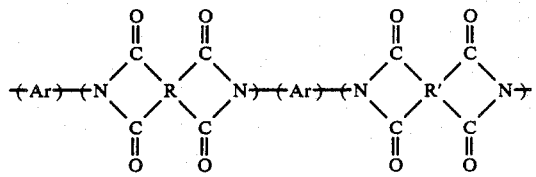

Where —Ar— is

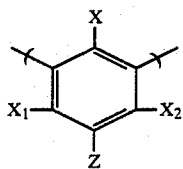 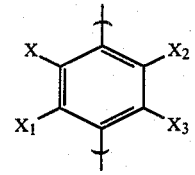

or mixtures thereof,  is

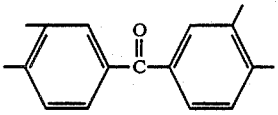

and $\diagdown_R'\diagup$ is

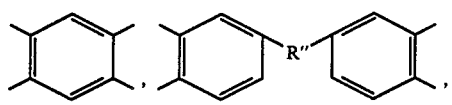

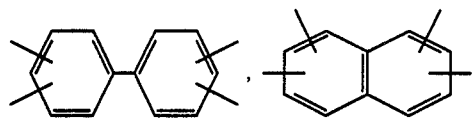

or mixtures thereof

—X, —X₁, —X₂, and —X₃ are independently primary or secondary alkyl group having 1 to 6 carbon atoms preferably methyl or ethyl, —Z is —H, —X, —X₁, —X₂, or —X₃ and —R" is

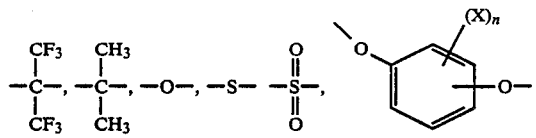

(where n=0 to 4) or alkylene radicals of 1 to 3 carbon atoms and from 5 to 100% of —R— and R' are R, whereby at least one of said gases is enriched upon permeating the membrane.

2. The process of claim 1 wherein —X, —X₁, —X₂, and —X₃ are —CH₃ or —C₂H₅.

3. The process of claim 2 wherein

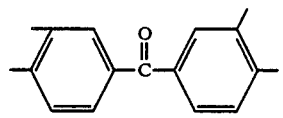

4. A gas separation membrane formed of a photochemically crosslinked aromatic polyimide of the formula

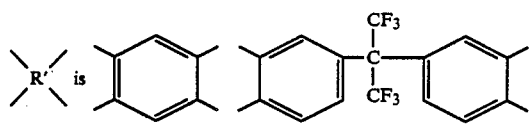

Where —Ar— is

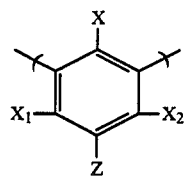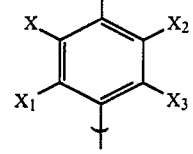

or mixtures thereof, $\diagdown\!\!\!\diagup \atop \diagup\!\!\!\diagdown$ R is

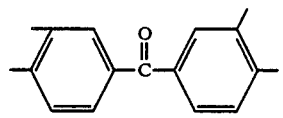

and $\diagdown\!\!\!\diagup \atop \diagup\!\!\!\diagdown$ R' is

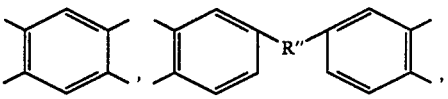

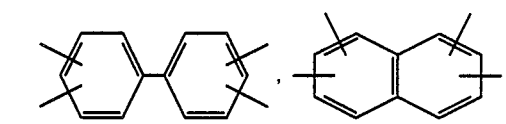

or mixtures thereof

—X, —X₁, —X₂, and —X₃ are independently primary or secondary alkyl groups having 1 to 6 carbon atoms preferably methyl or ethyl, —Z is —H, —X, —X₁, —X₂, or —X₃ and —R" is

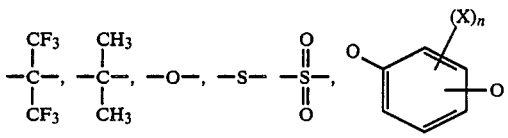

(where n=0 to 4) or alkylene radicals of 1 to 3 carbon atoms and from 5 to 100% of —R— and R' are R.

5. The membrane of claim 4 wherein —X, —X₁, —X₂, or —X₃ are —CH₃ or —C₂H₅.

6. The membrane of claim 5 wherein

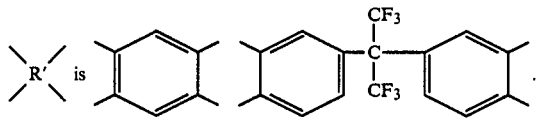

* * * * *